(No Model.) 2 Sheets—Sheet 1.
E. N. BICKLEY.
COMBINED CULTIVATOR AND COTTON CHOPPER.
No. 577,713. Patented Feb. 23, 1897.
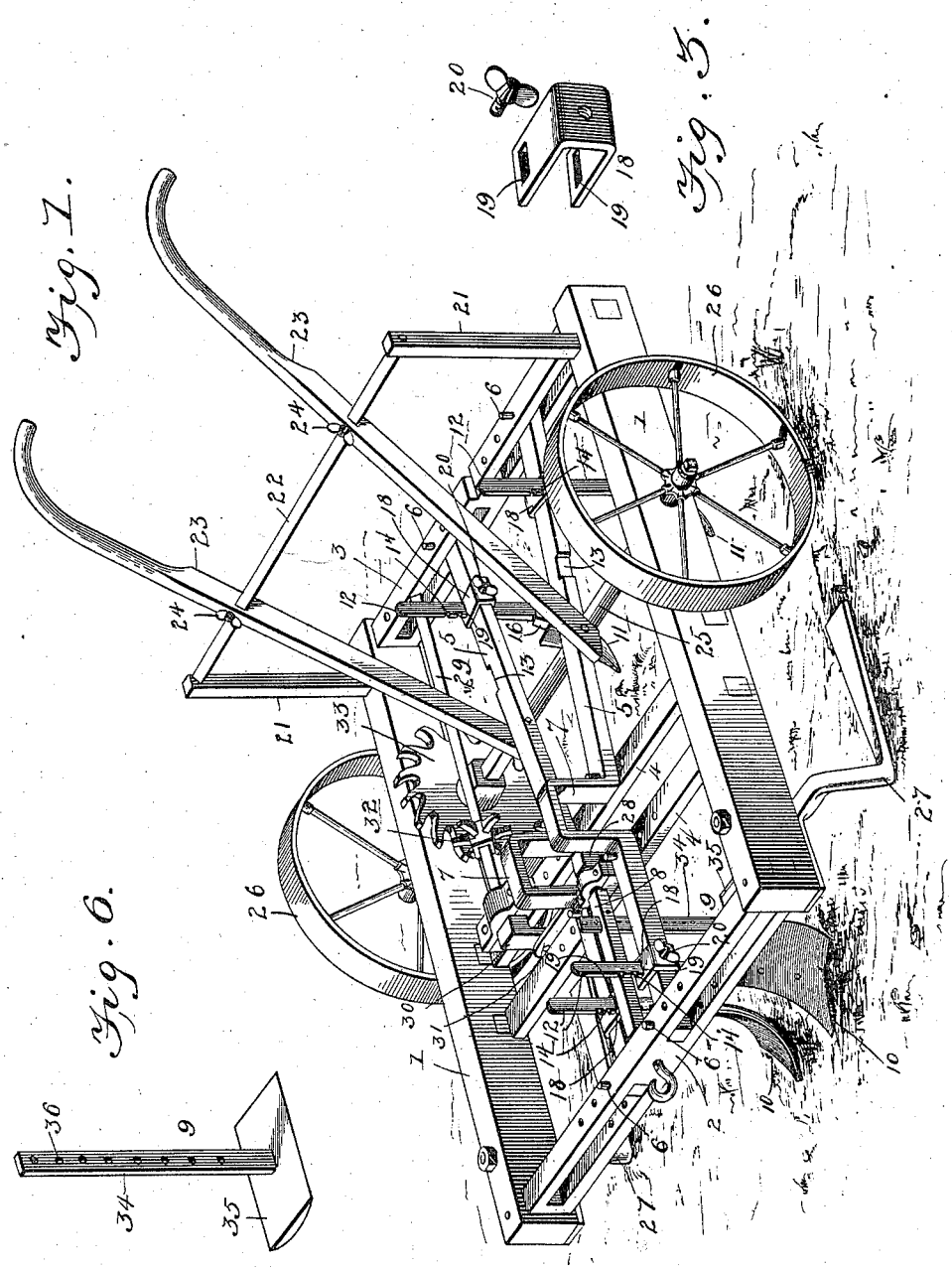
Witnesses
E. H. Monroe
U. B. Hillyard.
Inventor
Eli N. Bickley,
By his Attorneys.
C. A. Snow & Co.

(No Model.) 2 Sheets—Sheet 2.
E. N. BICKLEY.
COMBINED CULTIVATOR AND COTTON CHOPPER.
No. 577,713. Patented Feb. 23, 1897.
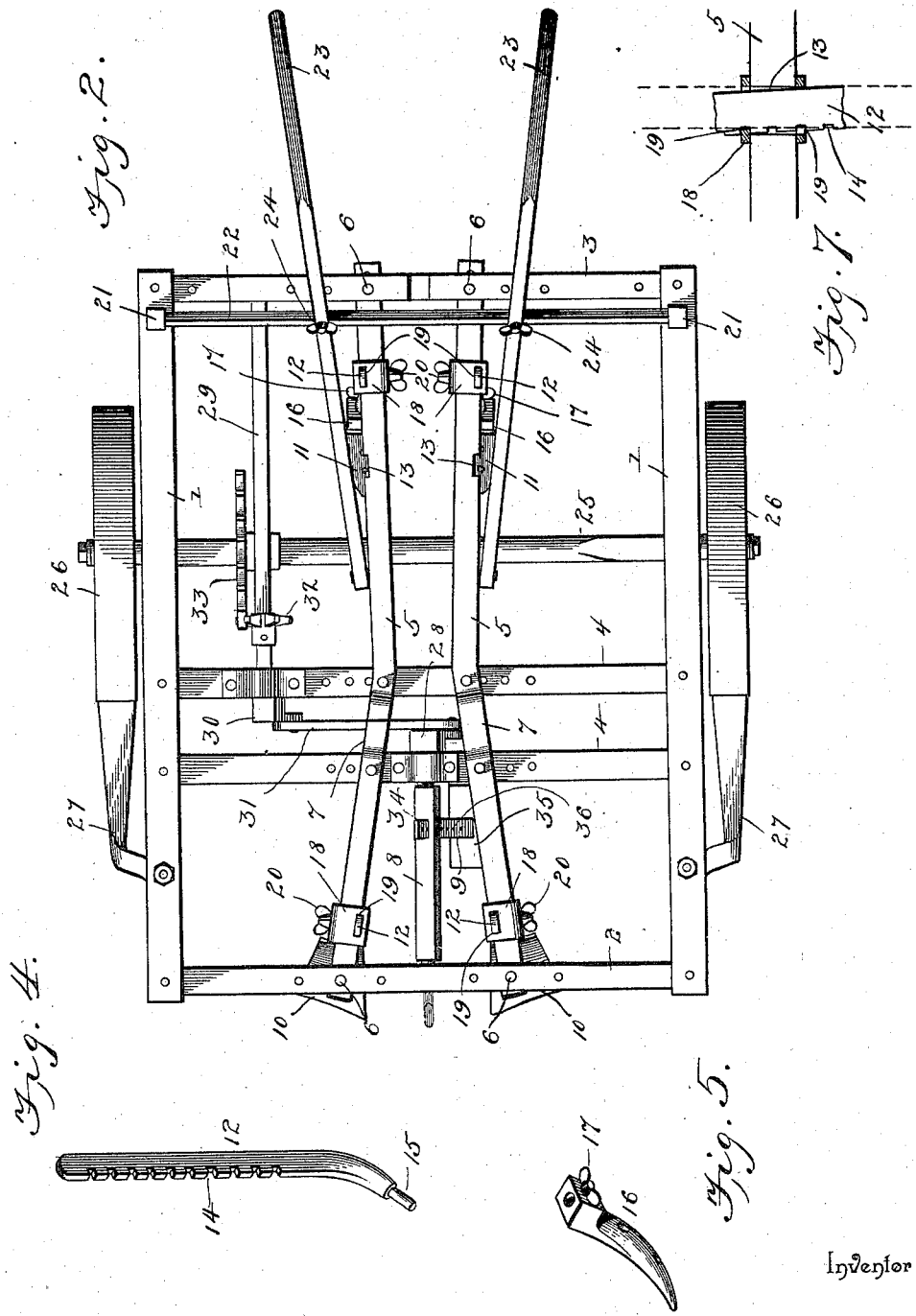
Witnesses
E. H. Monroe
V. B. Hillyard
By his Attorneys,
C. A. Snow & Co.
Inventor
Eli N. Bickley,

UNITED STATES PATENT OFFICE.

ELI NICHOLS BICKLEY, OF HARRISBURG, ARKANSAS.

COMBINED CULTIVATOR AND COTTON-CHOPPER.

SPECIFICATION forming part of Letters Patent No. 577,713, dated February 23, 1897.

Application filed May 20, 1896. Serial No. 592,348. (No model.)

*To all whom it may concern:*

Be it known that I, ELI NICHOLS BICKLEY, a citizen of the United States, residing at Harrisburg, in the county of Poinsett and State of Arkansas, have invented a new and useful Combined Cultivator and Cotton-Chopper, of which the following is a specification.

The purpose of this invention is to provide an agricultural implement which can be used solely for cultivating or thinning rows of cotton-plants or as a combined cultivator and cotton-chopper; and the principal object in view is to provide means for adjusting the hoe or cotton-chopper and the several blades according to the character of the land and the nature of the work to be performed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of an implement embodying the features of this invention. Fig. 2 is a top plan view showing some of the parts differently related. Fig. 3 is a detail view of a clip and binding-screw for securing a standard to a beam in an adjusted position. Fig. 4 is a detail view of a standard.
Fig. 5 is a detail view of a foot-piece for connecting a shovel or blade to a standard. Fig. 6 is a detail view of the hoe or cotton-chopper. Fig. 7 is a detail view showing the manner of connecting a standard with a clip.
Corresponding and like parts are referred to in the following description and indicated in the several views of the accompanying drawings by the same reference-characters.

The frame of the implement may be of any desired formation, and, as shown, is of rectangular shape, and comprises side bars 1, front and rear bars 2 and 3, and intermediate parallel bars 4, the transverse bars being secured at their terminals to the side bars in any substantial way. The front and rear bars are similarly formed and comprise parallel members which are spaced apart a short distance and are located the one above the other, the members having a series of openings in their length in vertical coincidence.

Similar beams 5 extend lengthwise of the frame and have their middle portion touching the intermediate bars 4 and their terminals entering the space between the members comprising the front and rear bars and are secured to the latter in an adjusted position by means of pins or bolts 6, which pass through registering openings in the beams and members of the adjacent bars. These beams are arched opposite the space between the parallel bars 4, as shown at 7, to afford clearance for the means whereby motion is transmitted to the rock-shaft 8, bearing the hoe or cotton-chopper 9.

The parallel bars 4 have a series of openings in their length, through which and corresponding openings in the beams 5 pass pins or bolts, by means of which the beams are secured positively in an adjusted position. These beams 5 are deflected in opposite directions about midway of their terminals, thereby throwing their end portions out of a straight line and enabling the end portions to incline in opposite directions, whereby the blades 10 and 11, carried thereby, may be spaced a greater or less distance apart. The earth-treating devices, consisting of scraping-blades 10 and shovels 11, have connection with the beams 5 by means of standards 12, the latter being fitted to notches 13 in the sides of the said beams.

The standards 12 may be either straight or curved, according to the style of the blades or points fitted thereto, and are flat, one edge being formed with a series of notches 14, by means of which the standards are secured in a positive manner at any desired elevation. The lower end of each standard is reduced, as shown at 15, and a foot 16 is fitted to the reduced end and is held thereon in an adjusted position by means of a binding-screw 17, which passes through a threaded opening in the upper end of the foot, into which the part 15 is thrust. The blade or shovel is bolted, riveted, or otherwise secured to the foot 16, and by having the reduced end 15 made rounding the foot and shovel can be turned to any angular adjustment or moved to any elevation, the latter adjustment not being so essential because of the adjustable connection between the standard and the beam. The standards are secured to their respective beams by means of clips 18, the latter embracing three sides of the beams and having slots or openings 19 in their parallel members to receive the standards. A binding-screw 20 is threaded in an opening in the closed side of the clip and bears laterally against a beam, so as to move the clip to bind the standard when it is required to hold the latter in place. The slots or openings 19 correspond with the notches 13, and the front closed end of the slot in the upper member of a clip is slightly in the rear of the corresponding end of the slot in the lower member of the clip, so as to engage with a notch 14 of a standard and hold the latter in an adjusted position. Upon loosening the binding-screw 17 the standard having connection with the clip to which the said binding-screw is attached is liberated and can be adjusted vertically by rocking the lower end of the standard forwardly, which results in withdrawing the notch 14 out of engagement with the front end of the slot in the upper member of the clip. After the standard is properly positioned its lower end is moved rearwardly, thereby bringing a notch in engagement with the front closed end of the slot in the upper member of the clip, and upon retightening the binding-screw the position of the standard is fixed.

The shovels or blades can be set to throw the earth toward or away from the hills or rows of plants by turning the foot-pieces 16 upon the reduced ends 15 of the standards in the manner herein set forth. The shovels or blades can be brought closer together or moved farther apart by adjusting the beams 5 laterally with respect to the transverse bars of the frame, and these beams can be moved apart at one or both ends, according to the adjustment required.

Uprights 21 are secured at their lower ends to the side bars 1 and are connected at their upper ends by means of a transverse rod or bar 22. Handles 23 are secured at their lower ends to the beams 5 and have openings intermediate of their ends through which passes the transverse rod or bar 22, binding-screws 24 being provided to secure the handles upon the rod or bar 22 at an adjusted position, it being remembered that the handles 23 move laterally with the beams 5 when adjusting the said beams to properly space the shovels or blades according to the work in hand.

The axle 25 is journaled in bearings provided on the side bars 1 and is supplied at its ends with ground-wheels 26, the latter being secured to the axle so as to rotate therewith. Runners 27 are secured to the side bars 1 in advance of the ground-wheels 26, and their rear ends are expanded, so as to obtain a broad or extended bearing upon the ground immediately in advance of the ground-wheels. These runners in addition to supporting the frame serve primarily as fenders and pulverize clods or lumps which would otherwise tend to cause the implement to run unsteady and materially interfere with its effective and successful operation. These runners or fenders prepare and level the ground in advance of the wheels 26 and provide a track for the ground-wheels and cause the implement to run steady and be uniform in its operation.

The rock-shaft 8 is located intermediate of the front ends of the beams 5, and is mounted in bearings provided on the front bar 2 and the foremost bar 4, and has a crank 28 at its rear end. A shaft 29 is journaled in bearings on the rear cross-bar 3 and the rearmost bar 4, and has a crank 30 at its front end which is connected by means of a pitman 31 with the crank 28. The cranks 28 and 30 are of different relative lengths, so that a circular movement of the crank 30 will cause a vibratory or oscillatory movement of the crank 28, whereby the shaft 8 is rocked in its bearings and imparts a corresponding oscillatory movement to the hoe or cotton-chopper, whereby the rows of cotton are thinned as the implement advances over the ground. A pinion 32, secured upon the shaft 29, meshes with a gear-wheel 33 on the axle 25, and is the means whereby motion is transmitted from the axle to the shaft 29. The hoe or cotton-chopper comprises an arm 34 and a blade 35, the latter being secured about centrally to the lower end of the arm 34 and being placed at right angles thereto. The arm 34 has adjustable connection with the rock-shaft 8 and operates through an opening therein, and is provided in its length with a series of openings 36, through any one of which passes a pin or bolt whereby the arm is secured to the rock-shaft in an adjusted position.

When cultivating cotton, the scraping-blades 10 are located at the front end of the beams 5 and the hoe or cotton-chopper operates immediately in the rear thereof, and the shovels may be placed along the beams 5, as found most advantageous. As the implement is drawn over the field the hoe or cotton-chopper will oscillate and thin the rows by leveling or mowing down the plants within the path of the blade 35. When the implement is arranged for cultivating corn or other plants not required to be thinned, the hoe or cotton-chopper is dispensed with, and the actuating mechanism therefor may be removed or otherwise arranged so as not to interfere with the operation of the implement as a cultivator.

Having thus described the invention, what is claimed as new is—

1. In an agricultural implement, the combination of a beam, a notched standard bearing a blade or shovel, a clip having slots or openings in its parallel members to receive the standard, and having a closed end of one slot out of line with the corresponding closed end of the other slot, and means for securing the clip to the beam, substantially as and for the purpose set forth.

2. In combination, a notched beam, a standard having a series of notches at one edge, a clip having slots in its parallel portions to register with a notch of the beam, and having a closed end of one slot out of line with the corresponding closed end of the other slot, and a binding-screw operating through a threaded opening in the closed end of the clip to secure the latter upon the beam and the standard at an adjusted position, substantially as set forth.

3. In an agricultural implement, the combination with a frame bearing cultivating devices, of ground-wheels for supporting the frame, and runners secured to the side bars of the frame and having their lower portions expanded and forming fenders, and adapted to operate upon the ground in advance of the ground-wheels to pulverize the soil, substantially as and for the purpose set forth.

4. In combination, longitudinal beams having corresponding arched portions, a rock-shaft journaled intermediate of the beams and bearing a hoe or cotton-chopper, a power-driven shaft located to one side of the beams, and a crank-and-pitman connection between the power-driven shaft and the rock-shaft, the said pitman operating in the space formed by the arched portions of the beams, substantially as set forth.

5. In combination, a frame of substantially rectangular form, uprights rising from the frame and connected by a transverse rod, longitudinal beams having adjustable connection with the front and rear bars of the frame and deflected intermediate of their ends and provided with arches, handles secured to the longitudinal beams and movable therewith laterally, and having adjustable connection with the said transverse rod, cultivating devices attached to the opposite ends of the longitudinal beams, a rock-shaft bearing a chopping-blade, and actuating mechanism for operating the said shaft, substantially as set forth.

6. The herein-described implement for the purposes set forth, comprising a frame mounted upon ground-wheels and runners, the latter forming fenders and operating upon the ground in advance of the ground-wheels, laterally-adjustable beams having arched portions intermediate of their ends, cultivating devices having adjustable connection with the beams, a rock-shaft bearing a hoe or cotton-chopper and having a crank, a longitudinal shaft operatively connected with the axle bearing the ground-wheels and having a crank which is connected with the crank of the rock-shaft by means of a pitman, the latter operating in the space formed by the arched portions of the beams, an elevated transverse rod or bar, and handles secured at their lower ends to the beams and movable laterally therewith, and having adjustable connection with the said transverse rod or bar, substantially in the manner and for the purpose specified.

In testimony that I claim the foregoing as my own I have hereto affixed my signature in the presence of two witnesses.

ELI NICHOLS BICKLEY.

Witnesses:
J. B. ESTES,
CHAS. E. MOORE.